(12) United States Patent
Mouraret et al.

(10) Patent No.: US 10,729,229 B2
(45) Date of Patent: Aug. 4, 2020

(54) DEVICE AND METHOD FOR THREE-DIMENSIONALLY PRINTING A SLEEVE FOR RECEIVING A COSMETIC APPLICATOR

(71) Applicant: ALBEA SERVICES, Gennevilliers (FR)

(72) Inventors: Guillaume Mouraret, Paris (FR); François Luscan, St Gratien (FR)

(73) Assignee: ALBEA SERVICES, Gennevilliers (FR)

( * ) Notice: Subject to any disclaimer, the term of this patent is extended or adjusted under 35 U.S.C. 154(b) by 376 days.

(21) Appl. No.: 15/598,288

(22) Filed: May 17, 2017

(65) Prior Publication Data

US 2017/0332774 A1 Nov. 23, 2017

(30) Foreign Application Priority Data

May 18, 2016 (FR) ...................... 16 54411

(51) Int. Cl.
| | | |
|---|---|---|
| *B29C 64/20* | (2017.01) | |
| *B33Y 10/00* | (2015.01) | |
| *B33Y 30/00* | (2015.01) | |
| *B33Y 80/00* | (2015.01) | |
| *A46B 5/02* | (2006.01) | |
| *A46B 9/02* | (2006.01) | |
| *A45D 40/26* | (2006.01) | |
| *B29C 64/106* | (2017.01) | |

(Continued)

(52) U.S. Cl.
CPC .............. *A46B 5/02* (2013.01); *A45D 34/042* (2013.01); *A45D 40/262* (2013.01); *A46B 5/04* (2013.01); *A46B 9/021* (2013.01); *B29C 64/106* (2017.08); *B29C 64/112* (2017.08); *B29C 64/20* (2017.08); *B29C 64/386* (2017.08); *B33Y 10/00* (2014.12); *B33Y 30/00* (2014.12); *B33Y 50/02* (2014.12); *B33Y 80/00* (2014.12); *A46B 2200/1053* (2013.01)

(58) Field of Classification Search
None
See application file for complete search history.

(56) References Cited

U.S. PATENT DOCUMENTS

| | | | | |
|---|---|---|---|---|
| 4,213,472 | A | † | 7/1980 | Gueret |
| 5,853,012 | A | * | 12/1998 | Burns ................... A45D 40/28 132/320 |

(Continued)

FOREIGN PATENT DOCUMENTS

| | | |
|---|---|---|
| FR | 2846534 | 5/2004 |
| WO | WO2013/0149697 | 10/2013 |
| WO | WO2015/0132734 | 9/2015 |

*Primary Examiner* — Jacob T Minskey
*Assistant Examiner* — Baileigh Kate Darnell
(74) *Attorney, Agent, or Firm* — Steven M. Greenberg, Esq.; Shutts & Bowen LLP

(57) ABSTRACT

A device for three-dimensionally printing a sleeve (10) for receiving a cosmetic applicator (20) is disclosed. The device includes a printer for printing in three dimensions. The printer is designed to receive a digital file and to print the sleeve. The device further includes a calculator capable of adapting the dimensions of the sleeve (10) to be printed to those of a user's finger. A method for three-dimensionally printing a sleeve (10) for receiving a cosmetic applicator (20) also is disclosed.

9 Claims, 1 Drawing Sheet

(51) Int. Cl.
*B29C 64/112* (2017.01)
*A46B 5/04* (2006.01)
*A45D 34/04* (2006.01)
*B29C 64/386* (2017.01)
*B33Y 50/02* (2015.01)

(56) References Cited

U.S. PATENT DOCUMENTS 8,172,473 B2 † 5/2012 Salciarini
2015/0165685 A1 * 6/2015 Klappert ............... B29C 64/386
 700/98

\* cited by examiner
† cited by third party

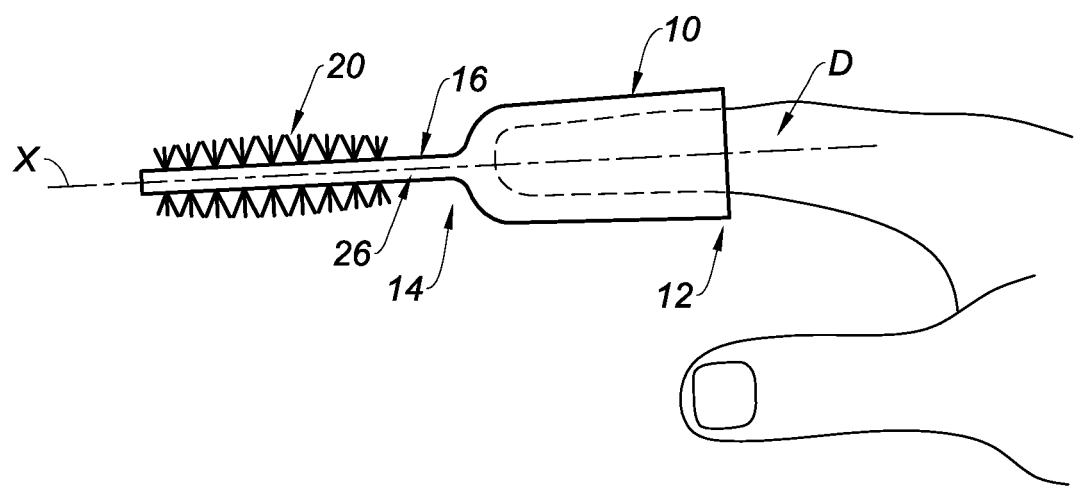

DEVICE AND METHOD FOR THREE-DIMENSIONALLY PRINTING A SLEEVE FOR RECEIVING A COSMETIC APPLICATOR

CROSS REFERENCE TO RELATED APPLICATIONS

This application claims priority under 35 U.S.C. § 119(a) to French Patent Application Serial Number 1654411, filed May 18, 2016, entitled "DEVICE AND METHOD FOR THREE-DIMENSIONALLY PRINTING A SLEEVE FOR RECEIVING A COSMETIC APPLICATOR", the entire teachings of which are incorporated herein by reference.

BACKGROUND OF THE INVENTION

Field of the Invention

The invention relates to a device for three-dimensionally printing a sleeve for receiving a cosmetic applicator. The invention also relates to a method for three-dimensionally printing a sleeve for receiving a cosmetic applicator.

Description of the Related Art

It is known to provide hollow sleeves for receiving a finger of a user and for supporting a cosmetic applicator. These standard sleeve allow the user to apply make-up using the applicator by sliding the sleeve directly onto one of their fingers.

It is also known to attempt to make these sleeves universal, allowing them to be used by fingers having small or large diameters equally. However, the ease of use of sleeves of this kind is rarely satisfactory.

BRIEF SUMMARY OF THE INVENTION

The invention therefore relates to a device for three-dimensionally printing a sleeve for receiving a cosmetic applicator, said device comprising a printer for printing in three dimensions, said printer being designed to receive a digital file and to print said sleeve. According to the invention, the device further comprises a calculating means capable of adapting the dimensions of the sleeve to be printed to those of a user's finger. The device according to the invention uses three-dimensional printing technology. This technology makes it possible to obtain personalized objects. The application thereof is particularly useful for small objects, for example a sleeve for receiving a cosmetic applicator.

A calculating means is therefore advantageously provided inside the device of the invention in order to match the dimensions of the sleeve to be printed to those of a finger of a given user. In other words, each sleeve is adapted to the specific morphology of a user. This has the advantage of providing a comfortable sleeve that the user may easily use, by sliding it onto their finger, in order to apply make-up using the cosmetic applicator received on said sleeve.

According to various embodiments of the invention, which can be taken together or separately:
the printing device of the invention further comprises a means that is designed to capture the dimensions of the user's finger, referred to as the image-capturing means, said image-capturing means is a camera integrated in a mobile telephone apparatus,
said image-capturing means is a scanner integrated in an interactive terminal,
said sleeve has a main longitudinal extension direction, referred to as the main direction, a proximal end, through which the user inserts their finger, and a distal end which is opposite said proximal end in the main direction and in the vicinity of which the sleeve comprises a seat for receiving said cosmetic applicator,
said cosmetic applicator is integral with said sleeve.

The invention also relates to a method for three-dimensionally printing a sleeve for receiving a cosmetic applicator The method includes several steps as follows:
a step of receiving the dimensions of a user's finger,
a calculation step for adapting the dimensions of the sleeve to be printed to the user's finger,
a step of three-dimensionally printing said sleeve using a three-dimensional printing device.

According to various embodiments of the invention, which can be taken together or separately:
the printing method of the invention further includes a step according to which the user informs the printing device of the outer shape of the sleeve to be printed,
the printing method of the invention further includes a step according to which the user informs the printing device of the type of the cosmetic applicator to be printed,
the printing method of the invention further includes a step of visual recognition of the dimensions of the user's finger.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein:

FIG. 1 is a schematic view of an embodiment of a sleeve obtained by a device according to the invention, and/or according to the method steps of the invention.

DETAILED DESCRIPTION OF THE INVENTION

The invention relates to a device for three-dimensionally printing a sleeve receiving a cosmetic applicator. "Sleeve" is understood to mean a hollow adaptor designed to cover a finger. In other words, a sleeve according to the invention is a blind part that is provided to be placed onto a finger. In reference to FIG. 1, the sleeve 10 has a main longitudinal extension direction, referred to as the main direction, which is given reference sign X in FIG. 1. The sleeve 10 has a proximal end 12, through which the user inserts their finger. The finger is provided with reference sign D in FIG. 1. The sleeve 10 further comprises a distal end 14 which is opposite said proximal end 12 in said main direction X.

In the vicinity of said distal end 14, the sleeve 10 includes a seat 16 for receiving a cosmetic applicator 20. In other words, a seat region 16 is provided between the sleeve 10 and the applicator 20. Therefore, the applicator 20 is either integral with the sleeve 10 and the seat 16, or said seat region 16 is hollow so as to receive a rod 26 of the cosmetic applicator 20, which cosmetic applicator 20 can therefore be removed from said sleeve 10.

The first alternative, involving the cosmetic applicator 20 which is integral with the sleeve 10, has the advantage of rapidly obtaining a ready-to-use cosmetic assembly using the device of the invention.

The second alternative, involving the cosmetic applicator 20 which can be removed from the sleeve 10, more particularly from the seat 16 of said sleeve 10, has the advantage of providing, by means of the device of the invention, a sleeve 10 adapted to the user's finger, which sleeve can then be used with various cosmetic applicators 20. In order to achieve this, a seat 16 provided with an internal thread, in particular for screwing in a threaded rod 26 of the cosmetic applicator 20, is provided. Any other means for connecting a hollow region—seat 16—to a substantially smooth rod—applicator rod 20—is conceivable; for example, a snap fit, a force fit or a wedge connection, this list not being limiting.

A "cosmetic applicator" is understood to mean an applicator 20 produced in the form of a mascara brush, a lip gloss applicator, a combination of a mascara brush and an applicator for highlighting the features of a user's eyes, or solely said latter applicator, this list not being limiting.

The device of the invention advantageously includes a printer for printing in three dimensions. The printer is designed to receive a digital file and to print the sleeve 10. The printer is advantageously designed to print the applicator 20 having said sleeve 10, in particular in the case of the first alternative described above.

According to the invention, the device further includes a calculating means capable of adapting the dimensions of the sleeve 10 to those of the user's finger D. In other words, the calculating means calculates as accurately as possible the dimensions of the space for receiving the finger D in the sleeve 10 so that the user can use the "sleeve 10 and applicator 20" assembly comfortably and without difficulty. In other words again, the play provided between the user's finger D and the sleeve 10, once said sleeve is on the user's finger D, is a play of approximately one millimetre or even approximately a few millimetres.

The calculating means may advantageously be a computer program controlled by an application installed on a mobile telephone apparatus or a computer program controlled by software installed on an interactive terminal.

The advantage of the device of the invention is, inter alia, the use of a printer for printing in three dimensions. This makes it possible to provide shapes for the applicator that cannot be produced by conventional and customary production means such as injection moulding.

This also makes it possible to obtain the sleeve 10 and/or the applicator 20 from rigid, semi-rigid, or even flexible materials, or even makes it possible to use different materials for the sleeve 10 and the applicator 20, even if said two components are rigidly interconnected, or even integral. Indeed, printing in three dimensions makes it possible to produce slices of the same part from a material that is different from the rest of said part.

Therefore, the sleeve 10 and/or the seat 16 may be made of a rigid plastics material, such as polypropylene, polyethylene terephthalate, polybutylene terephthalate, acrylonitrile butadiene styrene, acid-modified polycyclohexylenedimethylene terephthalate, polyethylene or polymethyl methacrylate.

The applicator 20 itself may be made of an elastomer material that is relatively flexible, such as Hytrel (registered trademark), or of a thermoplastic elastomer TPE or TPU, or even a low-density polyethylene. The applicator 20 may therefore be provided, advantageously, with a flexibility of between 55 and 70 Shore D.

Conversely, even though the shape of the space for receiving the finger D in the sleeve 10 (also known as the inner space) is dictated by the shape of the user's finger D, the outer shape of the same sleeve 10 may, in turn, have any cross section capable of meeting the aesthetic requirements for this type of product. The outside of the sleeve 10 may therefore have a polygonal, triangular, hexagonal or oval cross section, this list not being limiting; the outside of the sleeve 10 may also be etched, flocked or even have raised regions.

The printing device advantageously includes a means designed to capture the dimensions of the user's finger D, referred to as the image-capturing means. The image-capturing means (not shown here) may be, for example, a camera integrated in a mobile telephone apparatus (in this case a pico-camera) or a scanner integrated in an interactive terminal.

The invention also relates to a method for three-dimensionally printing a sleeve 10 of the kind that has just been described, the includes:
- a step of receiving the dimensions of a user's finger D,
- a calculation step for adapting the dimensions of the sleeve 10 to be printed to the user's finger,
- a step of three-dimensionally printing the sleeve 10 using a three-dimensional printing device.

The printing method of the invention advantageously includes a step according to which the user informs the printing device of the outer shape of the sleeve 10 to be printed, for example by selecting from a database that is available remotely or directly within the interactive terminal in front of which the user is located.

The printing method of the invention further includes a step of visual recognition of the dimensions of the user's finger, in particular before initiating the calculation of the space to be provided for receiving said finger inside the sleeve 10.

The printing method of the invention further includes a step according to which the user informs the printing device of the type of the cosmetic applicator to be printed, again for example, by selecting from a database that is available remotely or directly within the interactive terminal in front of which the user is located.

It should also be noted that variants are of course possible. In particular, it is also conceivable, in additional embodiments, for the image-capturing means of the invention to match a face, or the details of a face (eyes, lips, eyelashes) to a given applicator 20. Indeed, it is conceivable to prerecord, in a database that can be accessed remotely or directly within the interactive terminal in front of which the user is located, matches between cosmetic applicators 20 and particular facial features. This step therefore makes it possible to advise and/or help the user make a decision in order to directly adapt the applicator to the use that will be made of the "sleeve 10 and applicator 20" assembly, namely applying make-up to a specific part of the face.

Turning now to FIG. 2, a device (D) is shown that includes a printer (P), a calculator (C) and an image capturing means (I).

The present invention may be embodied within a system, a method, a computer program product or any combination thereof. The computer program product may include a computer readable storage medium or media having computer readable program instructions thereon for causing a processor to carry out aspects of the present invention. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing.

Finally, the terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "includes" and/or "including," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to embodiments thereof, it will be apparent that modifications and variations are possible without departing from the scope of the invention defined in the appended claims as follows:

We claim:

1. A device for three-dimensionally printing a sleeve for receiving a cosmetic applicator, said device comprising:
   a printer for printing in three dimensions, said printer receiving a digital file and printing said sleeve,
   said device further comprising a calculator adapting dimensions of the sleeve to be printed to those of a finger of a user;
   wherein said sleeve has a main longitudinal extension direction, a proximal end receiving the finger when inserted therein, and a distal end opposite said proximal end in said main longitudinal extension direction,
   wherein the sleeve further includes a seat proximate to the distal end receiving a cosmetic applicator, and also an inner space dictated by a shape of a finger of the user, the dimensions of the sleeve corresponding to the dimensions of the finger of the user, whereby each sleeve is adapted to the particular morphology of the finger of the user, and
   wherein said cosmetic applicator is integral with said sleeve.

2. The device of claim 1, further comprising an image capturing means adapted to capture dimensions of the finger.

3. The device of claim 2, wherein said image capturing means is a camera integrated in a mobile telephone apparatus.

4. The device of claim 2, wherein said image capturing means is a scanner integrated in an interactive terminal.

5. A method for three-dimensionally printing a sleeve for receiving a cosmetic applicator, the method comprising:
   receiving dimensions of a finger of a user,
   adapting dimensions of a sleeve to be printed on to the finger based upon the dimensions of the finger of the user, and,
   three-dimensionally printing said sleeve using a three-dimensional printing device according to the adapted dimensions
   wherein said sleeve has a main longitudinal extension direction, a proximal end receiving the finger when inserted therein, and a distal end opposite said proximal end in said main longitudinal extension direction,
   wherein the sleeve further includes a seat proximate to the distal end receiving a cosmetic applicator, and also an inner space dictated by a shape of the finger of the user, the dimensions of the sleeve corresponding to the dimensions of the finger of the user, whereby each sleeve is adapted to the particular morphology of the finger of the user, and
   wherein said cosmetic applicator is integral with said sleeve.

6. The method of claim 5, further comprising informing the printing device of an outer shape of the sleeve to be printed.

7. The method of claim 5, further comprising informing the printing device of a type of cosmetic applicator to be printed.

8. The method of claim 5, further comprising visually recognizing the dimensions of the finger.

9. A sleeve for receiving a cosmetic applicator, said sleeve comprising a main longitudinal extension direction, a proximal end receiving the finger when inserted therein, and a distal end opposite said proximal end in said main longitudinal extension direction, the sleeve further comprising a seat proximate to the distal end receiving a cosmetic applicator wherein said sleeve is obtained by a device for three-dimensionally printing comprising:
   a printer for printing in three dimensions, said printer receiving a digital file and printing said sleeve,
   said device further comprising a calculator adapting dimensions of the sleeve to be printed to those of a finger of a user,
   said sleeve comprising an inner space dictated by the shape of the finger of the user, the dimensions of the sleeve corresponding to the dimensions of the finger of the user, whereby each sleeve is adapted to the particular morphology of the finger of the user.

* * * * *